(No Model.)
F. KOHT.
SEEDER.
No. 274,343. Patented Mar. 20, 1883.
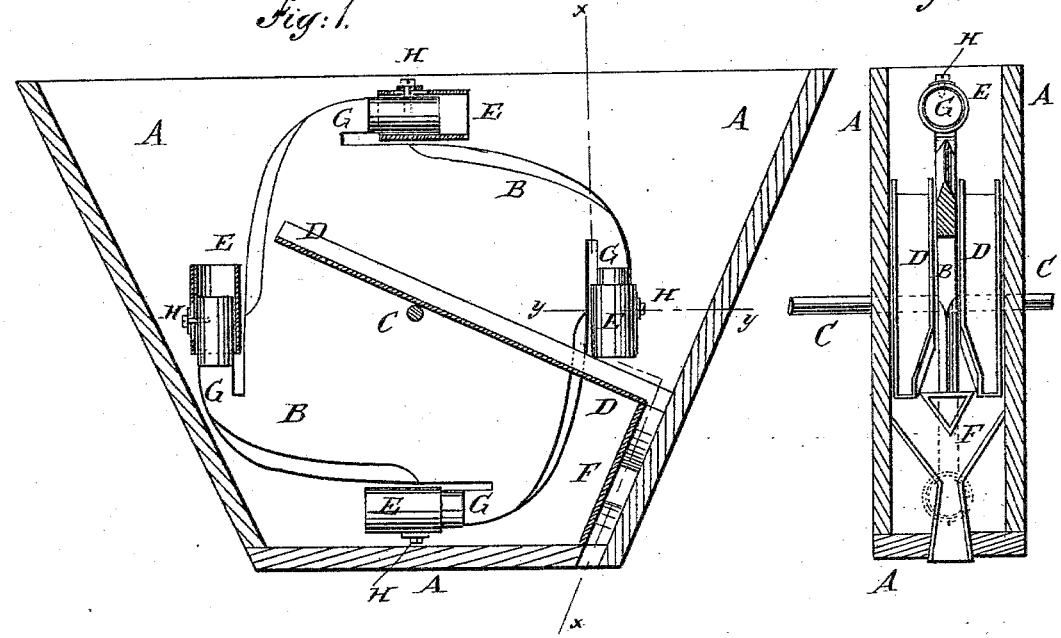
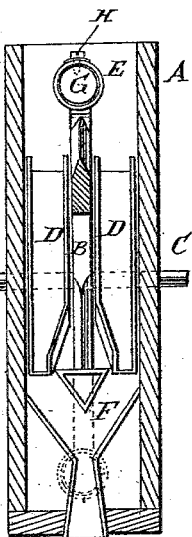
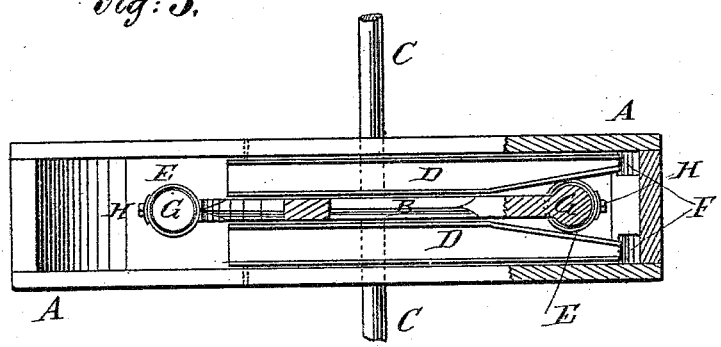
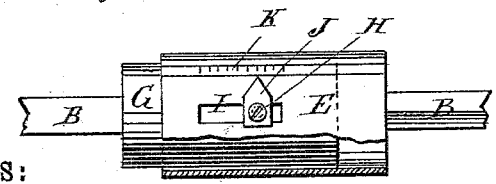
WITNESSES:
INVENTOR:
F. Koht
BY Munn & Co
ATTORNEYS.

UNITED STATES PATENT OFFICE.

FRANK KOHT, OF GLADBROOK, IOWA.

SEEDER.

SPECIFICATION forming part of Letters Patent No. 274,343, dated March 20, 1883.

Application filed December 6, 1882. (No model.)

*To all whom it may concern:*

Be it known that I, FRANK KOHT, of Gladbrook, Tama county, Iowa, have invented a new and useful Improvement in Seeders, of which the following is a full, clear, and exact description.

Reference is to be had to the accompanying drawings, forming part of this specification, in which similar letters of reference indicate corresponding parts in all the figures.

Figure 1 is a sectional side elevation of my improvement, shown as applied to the discharge-wheel and seed-box of a seeder. Fig. 2 is a sectional end elevation of the same, taken through the line $x\,x$, Fig. 1. Fig. 3 is a plan view of the same, partly in section through the line $y\,y$, Fig. 1. Fig. 4 represents one of my improved cups enlarged, and with part broken away.

The object of this invention is to facilitate the adjustment of the machine known as the "Gorham Seeder," to sow different quantities of seed, and to sow seeds of different sizes.

The invention consists in a seeder constructed with a seed-discharging wheel, provided with arms, upon which are placed cups slotted to receive the screws that secure them in place, so that they can be readily adjusted to contain more or less seed by loosening the said screws, the cup-fastening screws being provided with indexes pointing to the division-marks of scales upon the sides of the cups, so that the said cups can be accurately adjusted, as will be hereinafter fully described.

A represents the seed-box. B is the distributing-wheel, which is attached to the shaft C. The shaft C revolves in bearings in the walls of the seed-box A, and is designed to be driven from the axle of the machine in the ordinary manner.

To the seed-box A, at the opposite sides of the wheel B, are attached inclined spouts D, to receive the seed from the distributing-cups E and conduct it to the scatterer F, from which it falls to the ground. The cups E are made in tubular form, and are fitted upon cylindrical arms G, formed upon or attached to the rim of the wheel B in such positions that the cups E will be tangential to the said wheel B. The cups E are secured to the arms G by set-screws H, which pass through longitudinal slots I in the outer sides of the said cups and screw into the said arms, so that by loosening the screws H the cups E can be adjusted to project more or less beyond the ends of the arms G, and thus contain more or less seed. The screws H are provided with indexes J, which point to the marks of scales K formed upon the cups E, so that the said cups can be readily adjusted to contain the desired amount of seed.

The rim of the wheel B, in front of each cup E, is beveled upon its opposite sides to an edge, so that as the cups begin to incline as they pass upward and over by the revolution of said wheel the seed will fall readily into the spouts D and pass out of the seed-box.

Four cups, E, (more or less,) can be used upon each wheel B, as may be desired.

By this improvement the annoyance of having different sets of cups for different sizes of seeds is avoided, and the necessity of having different-sized gear-wheels to vary the speed of the distribution-wheels for regulating the amount of seed sown is removed, the only adjustment required being that of the cups E upon the arms G.

Having thus described my invention, I claim as new and desire to secure by Letters Patent—

1. In a seeder, the combination, with the fastening-screws H and the cups E, having slots I and scales K, of the indexes J, substantially as herein shown and described, whereby the said cups can be accurately adjusted, as set forth.

2. The wheel B, carrying the cups E, and provided with beveled peripheral edges, upon which the grain falls as discharged from the cups, in combination with the hopper or seed-box having the downward-inclined spouts D and scatterer F, substantially as and for the purpose set forth.

FRANK KOHT.

Witnesses:
E. B. C. BENEDICT,
J. E. CAREY.